United States Patent [19]

Saladino

[11] 4,043,853
[45] Aug. 23, 1977

[54] METHOD OF RENOVATING A SERIES OF IDENTICAL BATHTUBS

[76] Inventor: Matthew L. Saladino, 31 Pine Hill Road, Old Tappan, N.J. 07675

[21] Appl. No.: 664,228

[22] Filed: Mar. 5, 1976

[51] Int. Cl.² .............................................. B32B 35/00
[52] U.S. Cl. ..................... 156/94; 4/173 R; 156/256; 156/293; 156/299; 264/225
[58] Field of Search ................. 4/173 R; 156/94, 293, 156/299, 256; 264/225, 46.5

[56] References Cited

U.S. PATENT DOCUMENTS

| | | | |
|---|---|---|---|
| 2,695,256 | 11/1954 | Olloqui et al. | 4/173 |
| 2,784,417 | 3/1957 | Stand | 4/173 |
| 2,853,714 | 9/1958 | Darmstadt | 156/293 |
| 3,213,497 | 10/1965 | Scott | 264/225 |
| 3,931,651 | 11/1976 | Weir | 4/173 R |

Primary Examiner—Edward G. Whitby
Attorney, Agent, or Firm—Sughrue, Rothwell, Mion, Zinn and Macpeak

[57] ABSTRACT

One bathtub of an identical series of bathtubs has its surface protruding drain and overflow fittings removed, the exposed surfaces of the existing bathtub are lined with Plasterine of a thickness equal to a fiberglass liner to be full surface glued to the existing tub and a fiberglass working mold thickness, a layer of wet plaster of Paris is applied to the Plasterine lined bathtub, reinforced and dried to form an initial mold which is then removed from the Plasterine lined existant bathtub. The outer surface of the plaster of Paris initial mold is waxed and buffed to a high gloss finish. A thin fiberglass and resin working mold is layed up on the outer surface of the initial mold after applying a mold release agent. The working mold is finished off with a gel coat which, upon hardening, is buffed and waxed. A gel coat for the fiberglass tub liner is applied to the outer surface of the working mold and a coating of flame retardant polyester resin mix is hand layed or sprayed over the gel coat to produce a finished liner which is pulled or popped from the mold. The outer surface of the liner is applied with adhesive as is the exposed surface of the bathtub, and the liner is adhesively fixed to the bathtub over its full surface. The original drain and overflow fittings are refitted to formed holes within the liner corresponding to those of the drain and overflow openings of the existing bathtub.

5 Claims, 23 Drawing Figures

METHOD OF RENOVATING A SERIES OF IDENTICAL BATHTUBS

BACKGROUND OF THE INVENTION

1. Field of the Invention

The present invention relates to the renovation of bathtubs, and more particularly, to the renovation of a plurality of identical existing bathtubs within multiple housing units such as apartments and hotels.

2. Description of the Prior Art

Attempts have been made to renovate and refurbish existing bathtubs for housing units in which a great number of identical bathtubs are in existence and wherein the renovation is made without moving or in any major way disturbing the existing bathtub. U.S. Pat. No. 3,614,793 is exemplary of one method in which a bathtub liner assembly which is pre-manufactured of sheet steel coated with porcelain enamel and being of a size somewhat smaller than the existing bathtub is mounted on the tub with its surfaces being spaced from the existing tub surfaces and wherein appropriate plumbing connections are made through holes within the liner to the pipes coupling the drain fitting and the overflow fitting of the bathtub proper, and wherein perlite or other hardenable material fills the cavity between the liner and the existing bathtub to produce a relatively inflexible final renovated assembly.

In order to prevent the sides and bottom of the bathtub liner from flexing relative to the existing bathtub, either the sheet steel from which the liner assembly is formed is of relatively heavy gauge metal and therefore nonflexible, or great care must be taken in insuring that the cavity between the liner and the existing bathtub is completely filled with material which when solid prevents flexing of the liner in the absence of heavy gauge steel being employed as the stock sheet material in the formation of the bathtub liner. Further, the sheet metal liner being formed of sheet metal inherently by its very nature is subject to having the porcelain coating chipped or having portions of the liner bent during handling such as by shipment or during the process of assembly of the liner to the bathtub. Further, where the bathtub liner is made from sheet steel coated with porcelain enamel, the plumbing changes required to couple the existing plumbing piping to a liner which is somewhat smaller than the bathtub shell within which it is placed, requires additional plumbing changes, masonry work and tile work, adding to the cost of renovation of refurbishing. Further, in an attempt to fit all existing bathtubs with a universal unit, the liner is made excessively small with respect to many existing bathtub lengths, widths and depths, and this increased the volume of the voids between the bathtub and the liner which in turn increases the cost and mass of the inert granules needed to fill these cavities. In many cases, the universal liner does not conform to the original bathtub and changes the style completely which limits the acceptability of the renovation to those people where the style change is of no apparent concern. Further, upon using the liner when wet and soapy, slipping is inevitable on the sheet steel liner.

Further attempts have been made to renovate bathtubs in a manner other than that set forth in U.S. Pat. No. 3,614,793, one such method employs the epoxy spraying of the bathtubs to present a new appearance and to cover existing blemishes within the bathtub enamel coating. While this presents an initial new appearance when first sprayed, which is quite pleasing; after a short period of time, the surface becomes dull and is easily scratched, so in a very short matter of time, the renovated tub has an appearance which is even more unacceptable than that at the time renovation was initiated. This requires the respraying of the bathtub annually and, as mentioned, the deterioration in the surface finish is quite rapid.

SUMMARY OF THE INVENTION

The present invention is directed to a method of renovating a series of identical bathtubs in a multi-unit dwelling such as hotels or the like, the method comprises the steps of removing if necessary, from one of the existing tubs, the drain and overflow fittings which protrude beyond the surface of the tub proper; lining the exposed surfaces of the bathtub with Plasterine of a thickness equal to that of the liner to be applied plus the working mold thickness; applying a layer of wet plaster of Paris to the Plasterine lining to form the initial mold, preferably in multiple section form; reinforcing the plaster of Paris and drying the plaster of Paris prior to removing of the initial mold in unitary or sectional form.

The outer surface of the plaster of Paris mold is treated, waxed and buffed to a high gloss finish, and this surface has applied thereto a mold release agent. A hand layed up or spray gun applied fiberglass and resin layer forms the base of the working mold and a gel coat is applied to the outer surface of the fiberglass working mold. Upon curing of the gel coat, the working mold is removed from the initial mold, the gel coat surface is buffed and waxed and provided with a mold release agent. Gel coat is applied to the mold release agent coated working mold, and upon curing, a fiberglass liner is formed by applying a one and one-half ounce polyester fiberglass netting layed over a coat of flame retardant polyester resin mix on the gel coat, assuming hand lay up formation of the fiberglass liner occurs, and upon curing of this resin, further applications of resin and fiberglass matting are repeated to give the liner at least two layers. When the second layer is cured, the finished product is popped from the mold. The exposed surface of the existing bathtub to receive the liner is roughened, cleaned and degreased, and an impervious structural adhesive is applied to the clean roughened surface of the bathtub, and an ashesive accelerator is applied to the fiberglass liner on those surfaces which will contact the surfaces of the existing bathtub. The liner is nested in full surface contact with the existing tub, and side and end panels manufactured from wooden molds by laminated gel coat covered fiberglass sheets are installed onto the exterior end and side walls of the tub below the front edge of the tub liner to complete the renovation. The finished liner and panels are approximately 3/16 inch in thickness and drain holes drilled in the fiberglass liner conform to the drain and overflow of the existing bathtub to permit a chrome ring or washer to cover the unfinished edges of each hole made within the liner, and are adhesively or otherwise affixed to the liner to complete the renovation of the bathtub. Identical liners may be completed from the same working molds and applied to identical existing bathtubs within the other housing units.

DESCRIPTION OF THE PREFERRED EMBODIMENT

Figure 1A:
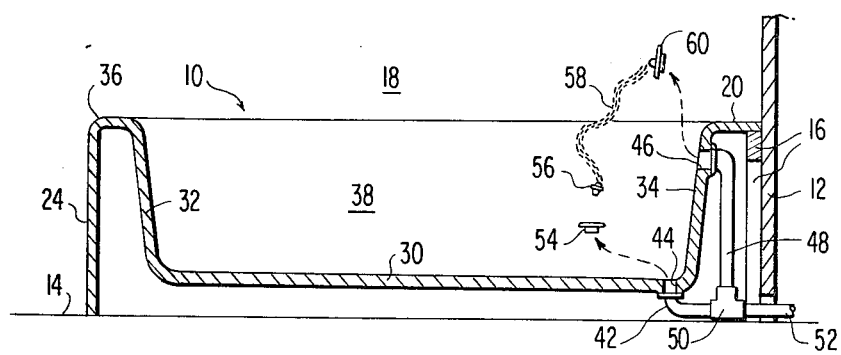
FIG. 1A is a sectional elevational view of an existing porcelain lined metal bathtub within a given housing unit.

Reference to FIG. 1A discloses an installed, original bathtub identified generally at 10 within a building unit formed by an end wall 12, side wall 18, and a floor 14, the bathtub 10 being formed of porcelain coated metal. As further seen in FIGS. 1B–1D, 2×4s or other wooden framework members 16 are nailed to end wall 12 and side wall 18 to support ledge 20 of the original bathtub 10, the bathtub 10 being further provided with an integral front end wall 24 and exterior side wall 26 and being provided with tapered interior side walls 28 and a bottom wall 30 and interior end walls 32 and 34. This arrangement creates an integral exterior edge 36 opposite the ledge 20 abutting walls 12 and 18 of the housing unit. Thus, the bathtub is formed with a tub cavity 38 within which water accumulates and which water is permitted to normally drain therefrom by way of bottom discharge drain fitting 42 constituting a flanged pipe sealably mounted within an opening 44 within the bottom wall 30 of the bathtub. In conventional fashion, a circular opening or hold 46 is formed within the end wall 34 of the tub which sealably receives one end of flanged pipe 48 defining the overflow drain connection. By way of a T coupling 50, water may be removed from the tub through a common return pipe 52. Conventionally, a drain fitting ring shown at 54 fits within hole 44 and overlies fitting 42 and is sealably carried by the bottom of the bathtub 10 to permit a drain plug 56 to be removably inserted within the drain fitting and to selectively accumulate water within the tub cavity 40. The plug 56 may be attached by chain 58 to a second flanged chrome ring 60 which is sealably mounted within hold 46 opening to one end of the overflow outlet pipe 48.

The present invention constitutes a fabrication and fitting technique for laminating a fiberglass bathtub liner directly to an existing bathtub and to permit the fabrication of a plurality of such liners from a mold which in itself is formulated from one of a series of identical tubs. The liner is characterized by being relatively thin, formed of resin and fiberglass with a gel coat finish, and to be applied in such a manner that it is in complete adhesive bond with the exposed surfaces of the tub and which requires no modification of the existing tub, while conforming exactly to the configuration of the existing tub.

To effect that desired result, the present invention requires the completion in sequence of an initial mold, a working mold and the final fiberglass liner and associated end and side panels, and the adhesive fixing of the same directly to the exposed wall surfaces of the existing tub.

Figure 1B:
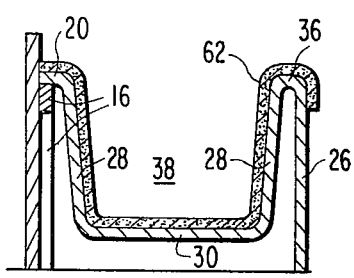
FIG. 1B is a transverse sectional view of the existing bathtub with a Plasterine layer in place.

The sequence in the manufacture of the initial mold, the working mold and subsequently, from the working mold, a plurality of identical tub liners for renovation of a plurality of identical existing tubs within a multi-tub housing unit may be readily seen from the sequence of FIGS. 1B through 5G inclusive. Reference to FIG. 1B, which shows a transverse section of the bathtub 10 of FIG. 1A and illustrates the first step in the preparation of the initial mold. Important to the present invention is the fact that since the fiberglass liner with the gel coat finish is on the order of 3/16 inch in thickness, and since the liner closely matches the configuration of the tub within which it nests, and since the relatively thin liner permits the liner to be applied to an existing tub without plumbing changes and permits the chrome rings or washers normally outlining and covering the outlet drain, the overflow drain and valve control elements (not shown) extending through the sidewall of the tub, it is necessary in the sequence of the preparation of the initial mold to reduce the size of that mold appropriately by a dimension equal to the thickness of the liner to be applied and the thickness of the working mold which is made from the initial mold and which is employed in the production of that fiberglass liner.

In that respect, the process of the present invention employs, as an initial step, the covering of the existing bathtub cavity defining surfaces and the upper ledge 22 and edge 36, and a lip portion of exterior side and end walls 26 and 24 respectively, with a pliable material such as Plasterine or similar non-hardening clay material. This material normally comes in the form of blocks which may be readily cut into reduced thickness layer strips by a cheese cutter or the like, and the strips are applied side by side to cover the surfaces of the existing bathtub 10 as shown in FIGS. 1B and 1E, to the extend desired for the creation of initial mold 64 from which the basic working mold is formed. Assuming for instance that the thickness of the working mold is essentially the same as the finished fiberglass liner and being formed of the same material, it is necessary to provide a Plasterine layer of three-eighth inch thickness prior to the formation of the initial mold 64. The initial mold 64 is made of plaster of Paris, the plaster of Paris being worked up into moist or wet fluid condition and applied by hand to the surfaces of the Plasterine which covers the walls of the initial existing bathtub to the extend shown in FIG. 1C. In order to provide stability to the plaster initial mold, a framework of plastic tubing as at 68 is embedded within the irregular thickness plaster of Paris 66 and the plaster cast formed in that manner is thoroughly dired prior to removing the same as seen in FIG. 1D. Further, by reference to FIG. 1E, it is seen that preferably the initial plaster mold 64 is formed in two sections as at A, B, longitudinally separated by a vertical foil 70 whose lower end is partially embedded within the Plasterine material 62 prior to the application of the wet plaster of Paris 66.

Figure 1C:
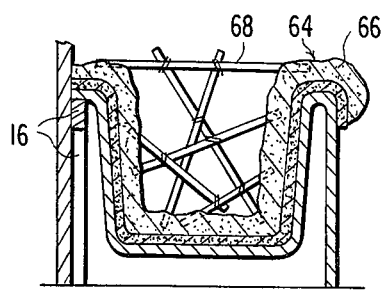
FIG. 1C is a sectional elevation similar to FIG. 1B with the plaster of Paris initial mold in place.
Figure 1D:
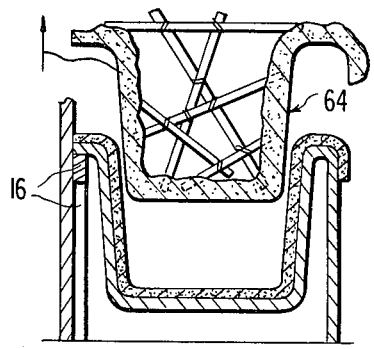
FIG. 1D is a similar sectional elevation during initial mold removal.
Figure 1E:
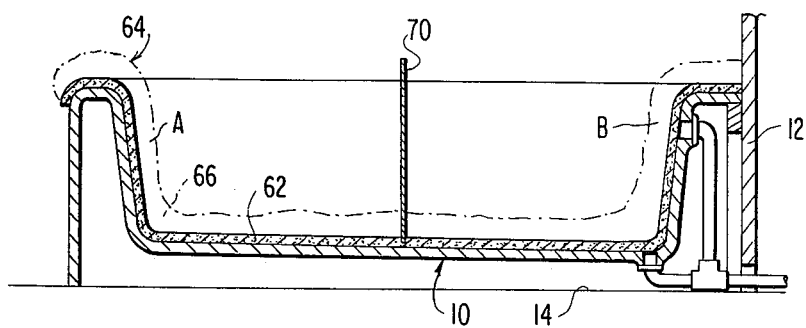
FIG. 1E is a longitudinal section of the existing bathtub similar to that of FIG. 1A with the initial mold in place and prior to initial mold removal.
Figure 2A:
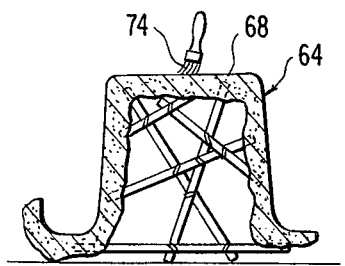
FIGS. 2A–2C inclusive, are elevational views in sequence of the initial mold illustrating in sequence the steps in the manufacture of the working mold.
Figure 2B:
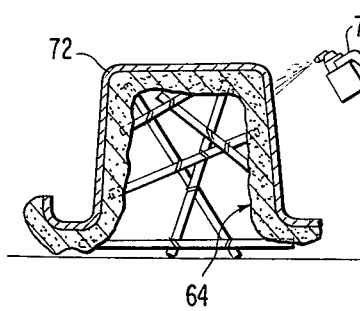
Figure 2C:
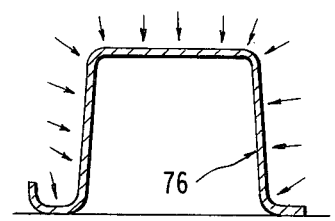

FIGS. 1C and 1D represent sectional elevational views which extend through foil 70 and thus the initial mold 64 of FIGS. 1C and 1D is in fact on half or section A of that mold. The mold halves A and B are joined prior to the production of the working mold, the sequence of its operation is seen in FIGS. 2A, 2B and 2C. In the formation of the working mold, the initial mold is inverted first as seen in FIG. 2A prior to treating, waxing and buffing the outer surface 68 of the same with the outer surface of the initial mold is further waxed and buffed with a high quality mold release paste wax or sprayed with a vinyl alcohol film parting agent or the like prior to the sequence of steps shown in FIGS. 2A to 2C. Either by a hand lay up technique or by way of sprayed on, sprayed up or chopper gun application, a working mold of laminate form is formed whose interior comprises fiberglass and resin and whose exterior comprises a thin gel coat of approximately 20/1000 to 25/1000 of an inch thickness. In FIG. 2A, brush 74 illustrates one step of a hand layed up technique involving the application of a flame retardant polyester resin mixed to the mold release coated, plaster of Paris initial mold 64. Subsequent to the application of the resin mix by brush 74, one and one-half ounce polyester fiberglass matting for example is layed over the resin, the fiberglass matting is then thoroughyl mixed with the resin using brush 74 with a stippling motion, the resin is allowed to cure, and a subsequent application of resin and fiberglass matting is repeated to give the liner preferably two layers or more. When the desired thickness of approximately just short of 3/16 inch of cured fiberglass is formed, the last step is the applying of a gel coat as seen at 72 by spray gun 78, FIG. 2B, of 20/1000 to 25/1000 of an inch in thickness to the outer surface of the working mold 76.

As shown in FIG. 2C, by the multiple arrows, subsequent to the curing of the gel coat, the gel coat on the exterior surface of the working mold 76 is buffed to a high gloss.

In contradiction to the sectional plaster of Paris initial mold, 64, the working mold is unitary. In applying the gel coat to form the glossy finish to the exterior surface of the working mold 76, it is best accomplished by making two or three passes by holding gel coat application spray gun 78 perpendicular to the mold surface, FIG. 2B, after the polyester resin mix is suitably cured. The gel coat, after curing, may then be ready for buffing and waxing, the step illustrated in FIG. 2C prior to employment of the working mold in the production of a liner for the existing tub 10. Preferably, the gel coat is provided on the exterior of the fiberglass working mold 76 prior to removal of the working mold from the initial plaster of Paris mold 64.

Reference to FIGS. 3A–3D inclusive illustrates sequences, in alternate form, for the production of the fiberglass liner from the working mold. Under a hand lay up technique, the sequence is FIGS. 3A, 3B, 3A, 3B and 3D. It is seen that the reverse procedure is employed in the formation of a bathtub liner from that employed in the formation of the working mold 76. That is, in the working mold, the gel coat is on the external surface of the working mold, while in the liner, the gel coat is on the inner surface since it is this inner surface which will be exposed when the liner is nested and forcibly adhesively applied in direct contact with the exposed surfaces of the existing bathtub 10, particularly forming principally cavity 40 of that tub.

In the completed working mold, FIG. 2C, that mold is preferably buffed to a high gloss finish and a suitable mold release agent such as a mold release paste wax is applied and buffed or a vinyl alcohol film parting agent is applied in similar manner to the exterior surface of the plaster of Paris mold 64 prior to the lay up or formation of the fiberglass working mold 76. With the mold release or parting agent coating on the working mold 76, the mold is employed in the sequence of FIGS. 3A through 3D in the preparation of the bathtub liner in a sequence which is initiated by the application of the gel coat by spraying the gel coat coating material 84 onto the exterior surface of the working mold 76 by spray gun 78, FIG. 3A. Again, the gel coat which forms the glossy finish to the liner is applied to the working mold to form a layer approximately 0.020 to 0.025 inch in thickness. Multiple passes of spray gun 78 may achieve the thickness desired, preferably holding the gun at a distance of approximately 18 to 24 inches from the working mold 76. The gel coat is preferably given from 45 to 60 minutes curing time after gellation, and when the gel coat is properly cured, a fiberglass laminating procedure may be accomplished.

Figure 3A:
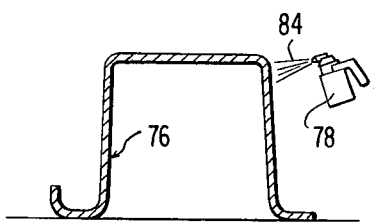
FIGS. 3A–3D inclusive are sectional elevations of the working mold illustrating, in alternate sequence, the steps in forming the improved fiberglass bathtub liner from the working mold.
Figure 3B:
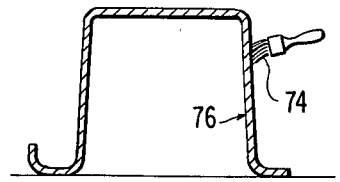
Figure 3C:
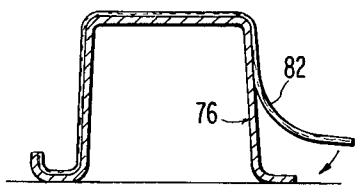
Figure 3C:
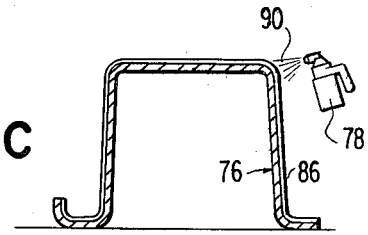
Figure 3C:
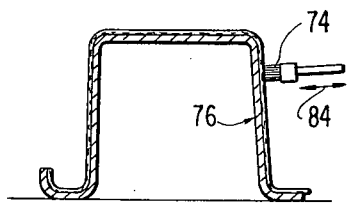
Figure 3D:
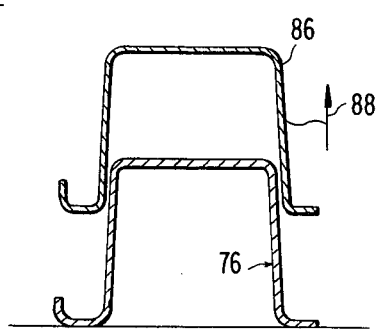

In FIG. 3B, brush 74 is employed to apply a coat of flame retardant polyester resin mix over the gel coat on the outer surface of the working mold 76 and as further seen in FIG. 3CA fiberglass matting 82 is laid over the resin prior to the resin curing and the fiberglass matting is then thoroughyl mixed with the resin using a brush 74 with a strippling motion indicated by arrow 84. The steps of FIGS. 3B, 3CA and 3CB are repeated after the resin is allowed to cure, with the initial fiberglass matting 82 in placed giving the bathtub liner 86, FIG. 3D, at least two layers. When the last of the multiple fiberglass and resin layers is cured, the finished liner 86 may then be pulled or popped from the working mold 76 as seen by arrow 88, FIG. 3D, and is ready for installation on the existing bathtub 10.

As mentioned previously, a sprayed on, sprayed up or chopper gun fiberglass technique may be employed in the building of the liner 86 as well as the working mold 76. In this respect, FIG. 3CC illustrates an alternate step to the multiple steps of FIGS. 3CA and 3CB. The completion of the liner 86 uses a sprayed on, sprayed up or chopper gun application in which resin mix and fiberglass are commonly sprayed at 90 by spray gun 78 to produce the liner 86 on the same working mold 76. In that regard, the spray gun 78 may use different nozzles feeding the resin, catalyst and fiberglass.

Figure 4A:
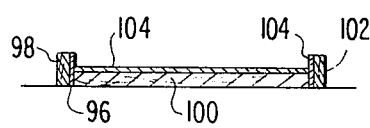
FIG. 4A is an elevational view of a first wooden mold employed in the production of a fiberglass end panel to be applied to the existing tub in addition to the liner.
Figure 4B:
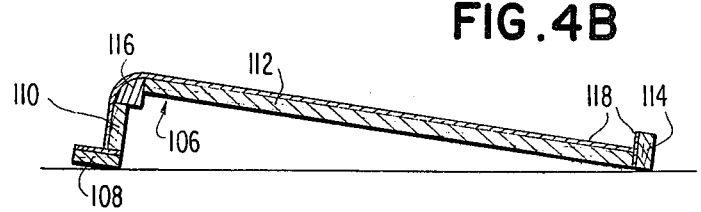
FIG. 4B is an elevational view of a second, wooden mold employed in the production of a fiberglass side panel employed in the renovation of the existing bathtub of FIG. 1A.
Figure 5A:
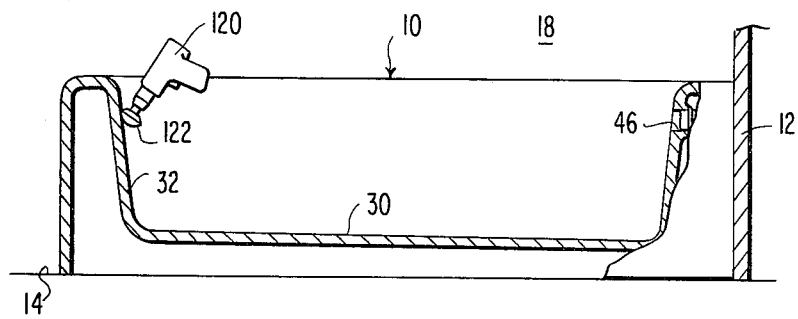
FIGS. 5A–5F are sectional views illustrating, in sequence, the steps of applying the fiberglass liner and panels to the existing tub under the method of the present invention.
Figure 5B:
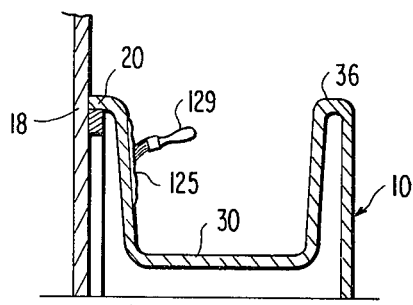
Figure 5C:
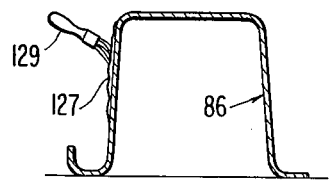

Turning to FIGS. 4A and 4B, these figures are side elevational views of a pair of wooden molds employed in the formation of fiberglass end panel 92 and fiberglass side panel 94, FIG. 5C, which covers the exterior end wall and the exterior side wall of the existing bathtub 10, being applied to end wall 24 and side wall 26 respectively of that tub and acting in conjunction with the fiberglass liner 78 which nests within cavity 40 of bathtub 10 to cover the exterior surfaces of the existing bathtub 10. The wooden mold 96 is employed in the formation of the end panel 92 by use of the same fiberglass techniques illustrated in FIGS. 3A-3D, and is formed essentially of 2×4s as at 98 and ¾ inch plywood strips as at 98, 100 and 102, with each strip covered with a glossy Formica material as at 104, the glossy Formica receiving the mold release paste wax or vinyl alcohol film parting agent prior to the build-up of the gel coat and fiberglass laminate panel 92. In similar form, the mold indicated generally at 106 on FIG. 4B to form the side wall panel 94, FIG. 5G, is formed of ¾ inch plywood sections as at 108, 110, 112 and 114, the sections 110 and 112 being joined by a curved corner joint 116, and all of these members having their outer surfaces covered by Formica 118 having a glossy outer surface. The mold 106 is employed with mold 96 and mold 76 to fabricate the three separate fiberglass elements; liner 86, end panels 92 and 94 for covering the existing bathtub 10.

Figure 5D:
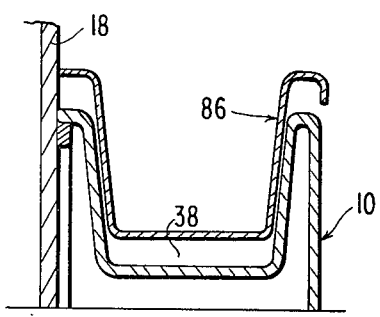
Figure 5E:
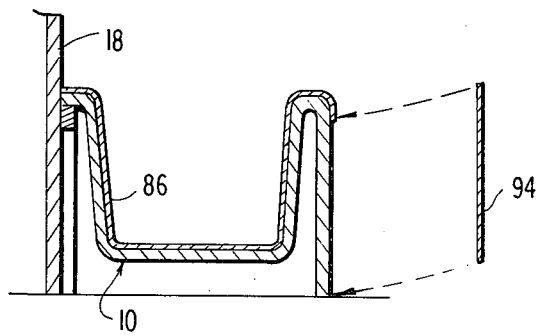
Figure 5F:
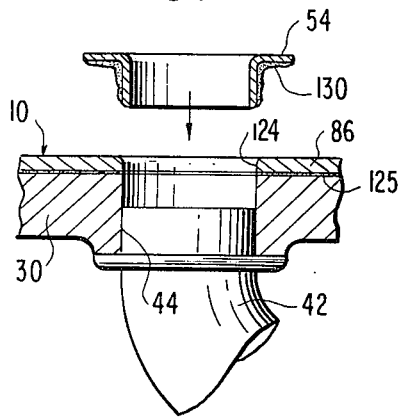
Figure 5G:
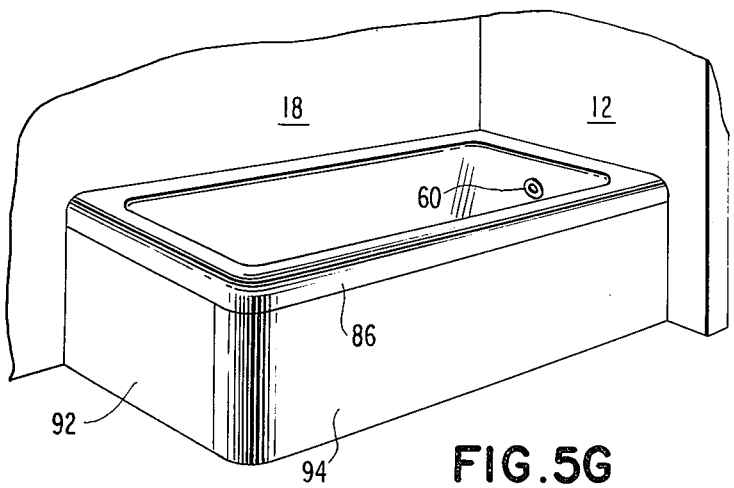
FIG. 5G is a perspective view of the existing tub after renovation by the present invention.

After fabrication of liner 86 and panels 92 and 94, the existing bathtub 10 is renovated in the manner illustrated in the sequence from FIGS. 5A through 5F. First, with respect to the existing bathtub 10, the exposed surfaces of the bathtub are thoroughly roughened by employing a power tool 120, FIG. 5A, carrying an emery wheel 122 or other abrasive element which abrades the surface to a sufficient extent that the liner and panels may be adhesively fixed to the otherwise smooth surfaces of the existing tub. Subsequent to abrading of the exposed surfaces of bathtub 10, these surfaces are cleaned and degreased by an appropriate cleaning agent (not shown). Prior to or subsequent to the actual lining of the tub cavity 40 with liner 86, holes may be drilled in the liner 86 corresponding to the openings within the existing bathtub 10 corresponding to openings 44 and 46 for instance for the outlet drain and the overflow fitting for the existing bathtub 10. In this regard, FIG. 5F illustrates a hole formed within the liner 86 corresponding exactly to the diameter of hole 44 within the existing tub bottom 30. Since the liner 86 and the panels 92 and 94 are to be applied to the bathtub in full surface contact with the exposed surfaces of the bathtub 10, it is necessary to insure that the liner is adhesively fixed to the tub over the major area of surface contact with the tub. In that respect, it is preferable that an impervious structural adhesive be applied to the exposed surfaces of the worn bathtub 10. As seen in FIG. 5D, the surfaces receiving the liner 86 and panels 92 and 94 are coated with an impervious structural adhesive 125 such as by use of an appropriate adhesive application brush 124. Similarly, the brush 124 may be employed to apply an adhesive accelerator 127 to those surfaces of the liner 86 and the panels 98 which will make contact with the surfaces of the existing bathtub 10, FIG. 5C. The liner 86 which has been purposely formed so as to complement exactly the configuration of the existing bathtub 10 is lifted to a position overlying the tub and is moved downwardly as shown by the arrow 126, FIG. 5D, to nest within the tub cavity 38 and pressure is applied to the liner to force the liner by way of adhesive 125, FIG. 5F, into intimate contact with the confronting surfaces of bathtub 10. With adhesive 125 applied to the exterior surfaces of side wall 26 and end wall 24 of tub 10 and with panels 92 and 94 carrying adhesive accelerator, the panels 94 and 92 are pressed against these walls and the adhesive hardened to complete the renovation of the bathtub, FIG. 5G, absent the replacement of the chrome rings as in FIG. 5F. Preferably, the side and end panels 94 and 92 are applied to the bathtub 10 subsequent to the placement of the liner within tub cavity 38, FIG. 5E, although a reverse procedure may be employed. As a last step, FIG. 5F, chrome plated ring 54, for instance, is pressed into the aligned holes 44 and 124 of the existing bathtub bottom 30 and liner 86, respectively. A waterproof adhesive 130 may be employed in fixing the chrome ring 54 in place with lip 56 overlying the edge portion of the liner 86 defining the opening 124 which receives the depending cylindrical portion 54b of that ring. In similar fashion, ring 60 may be sealably adhesively secured to an opening within the liner 86 conforming to overflow opening 46 just below ledge 22 of the existing bathtub 10. With respect to the molds 96 and 106 in FIGS. 4A and 4B, the wooden molds are designed to meet the measurement dimensions of the side and end of the existing tub and is desired, a design may be appropriately placed within the Formica sheets 104 and 118 of molds 96 and 106 respectively, such that the exterior gel coat surfaces of panels 92 and 94 subsequently formed by the molds will carry an esthetic pleasing design enhancing the beauty of the renovated bathtub. It may be seen that there is no space between the existing tub and the fiberglass liner and panels other than that occupied by the adhesive which effects a sealed bond between these elements and the existing tub. Further, with the exception of that thin adhesive layer, the tub is built up to a degree limited to the thickness of the fiberglass material plus the gel coat in an amount preferably 3/16 inch.

Further, while the illustrated method employs the requirement of producting an initial mold of plaster of Paris or the like and a subsequent working mold of fiberglass, it may be seen that once having the fiberglass working mold 76 for the liner 86 and the molds 96 and 106 for the panels 92 and 94, an indefinite number of liners and panels may be fabricated for use with identical size existing bathtubs to bathtub 10 from which the initial molds were created. Once molds 76, 96 and 106 are created, the cost of complete renovation of the succeeding tubs other than bathtub 10 is materially reduced.

While the invention has been particularly shown and described with reference to a preferred embodiment thereof, it will be understood by those skilled in the art that various changes in form and details may be made therein without departing from the spirit and scope of the invention.

What is claimed is:

1. A method of renovation of at least one existing bathtub for multi-unit dwellings or the like, said method comprising in sequence the steps of:

lining the exposed exterior surface of the existing bathtub including that portion defining the bathtub cavity with a pliable molding material of a thickness generally equal to that of the liner to be applied to the existing bathtub plus that of the working mold;

applying a mass of curable, pliable, initial mold material to the molding material lined existing bathtub to form an initial mold;

curing said initial mold, removing said initial mold from said molding material lined bathtub, inverting said initial mold, applying a mold release agent to the outer surface of the initial mold, applying at least one fiberglass and resin layer to said initial mold and curing said resin to form the base material of a working mold, applying a gel coat to the outer surface of the fiberglass and resin working mold and curing said gel coat to complete said working mold, removing the working mold from the initial mold, applying a mold release agent to the gel coat surface of the working mold to form a portion of a liner and curing said gel coat, applying at least one fiberglass and resin layer to the gel coat on said working mold and curing said resin to complete said liner, removing the finished liner from the working mold, applying adhesive to at least the exposed outer surface of the existing bathtub corresponding to that of the liner, nesting the liner within the existing bathtub, pressing the liner into contact over the full adhesive coated bathtub and curing said adhesive to complete renovation of the bathtub by applying a liner of slightly larger size and of equal configuration to the existing bathtub, removing protruding drain fittings from the exposed surface of said existing bathtub prior to lining of the exposed surface of the bathtub with pliable molding material and forming holes within the fiberglass and resin liner conforming to the drain openings prior to nesting and adhesively fixing the liner to the existing bathtub and completing the renovation of the bathtub by sealably replacing the drain fittings onto the openings within the liner at respective drain locations, and wherein prior to nesting of the liner within the existing bathtub, said method further comprises roughening, cleaning and degreasing the exterior exposed surface of the existing bathtub which receives said liner, and said step of adhesively fixing the liner to the exposed exterior surface of said existing bathtub comprises applying an impervious structural adhesive to the cleaned, roughened surface of the bathtub and an accelerator to the surface of the fiberglass liner which contacts the existing bathtub surface upon nesting of the liner within the bathtub.

2. The method as claimed in claim 1, wherein the step of lining existing bathtub external surfaces with molding material comprises cutting of non-hardening clay material in thin strip form from blocks and applying a plurality of side-by-side strips to the external exposed surfaces of the existing bathtub.

3. The method as claimed in claim 2, wherein said step of forming said initial mold comprises applying a mass of plaster of Paris in moist condition to the surfaces of the non-hardening clay material and embedding within the unset plaster of Paris a framework of plastic tubing to reinforce the plaster of Paris initial mold.

4. The method as claimed in claim 3, further comprising the step of longitudinally separating the initial mold plaster of Paris material into two sections by partially embedding the lower end of a vertical foil within the non-hardening clay material and applying wet plaster of Paris to the molding material lined existing bathtub on each side of the foil.

5. A method of renovation of a series of identical bathtubs within a multi-unit dwelling or the like, said method comprising the steps of:

removing drain fittings protruding outwardly of the bathtub exposed external surface from an existing bathtub, covering the existing bathtub cavity defining surface with adjacent strips of a pliable non-hardening clay material of a thickness of approximately three-eighth inch, applying a mass of wet, pliable plaster of Paris to the surface of the non-hardening clay to form an initial mold, embedding a framework of plastic tubing within the plaster of Paris prior to hardening to reinforce the plaster of Paris initial mold, setting the plaster of Paris and removing the initial mold from the lined existing bathtub, inverting the initial mold and waxing and buffing the outer surface, applying a mold release material to the buffed outer surface of the initial mold, applying fiberglass and uncured resin of slightly less than 3/16 inch thickness to the initial mold to form the base of a working mold, curing said resin, applying a thin gel coat of approximately 20/1000 inch thickness of the fiberglass and resin base to form a working mold of laminate form of approximately 3/16 of an inch in thickness, curing said gel coat, removing said working mold from said initial mold, buffing and waxing the gel coat of said working mold, applying a mold release material to the buffed and waxed gel coat surface of the working mold, applying a gel ocat of approximately 20/1000 inch thickness to the mold release coated working mold, forming at least one layer of fiberglass and uncured resin on the gel coated working mold and curing said at least one fiberglass and resin layer to form with said gel coat a liner of approximately 3/16 inch thickness, curing said liner, removing said liner from said working mold, forming holes within said liner corresponding to the drain openings within said existing bathtub, roughening, cleaning and degreasing the exposed exterior surfaces of the bathtub, applying an impervious waterproof structural adhesive to the abraded surfaces of the bathtub, applying an adhesive accelerator to the surface of the liner which contacts the surface of the existing bathtub during nesting of the liner within the existing bathtub, nesting the liner within the existing bathtub, and applying pressure to the liner to intimately adhesively bond the liner over its full surface with the existing bathtub, curing the adhesive, replacing and adhesively sealing the drain fittings to the holes within the liner;

whereby, a thin fiberglass liner of corresponding configuration is intimately bonded to the existing bathtub to form a renovated bathtub of essentially the same size and configuration.

* * * * *